US009280820B2

(12) United States Patent
Hutchison

(10) Patent No.: US 9,280,820 B2
(45) Date of Patent: Mar. 8, 2016

(54) CREATING CAMERA CLOCK TRANSFORMS FROM IMAGE INFORMATION

(71) Applicant: Google Inc., Mountain View, CA (US)

(72) Inventor: Allen Hutchison, San Jose, CA (US)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 14/337,680

(22) Filed: Jul. 22, 2014

(65) Prior Publication Data

US 2016/0027177 A1   Jan. 28, 2016

(51) Int. Cl.
  *G06T 7/00*     (2006.01)
  *G06K 9/62*    (2006.01)

(52) U.S. Cl.
  CPC ............ *G06T 7/0022* (2013.01); *G06K 9/6202* (2013.01); *G06K 9/6267* (2013.01); *G06T 7/0042* (2013.01); *G06T 2207/10004* (2013.01)

(58) Field of Classification Search
  CPC .... G06K 2209/03; G06T 7/00; G06T 7/0022; G06T 7/004; G06T 7/0042; H04N 1/32128; H04N 2201/3214; H04N 2201/328; H04N 2201/3284
  See application file for complete search history.

(56) References Cited

U.S. PATENT DOCUMENTS

| 6,904,160 B2 | 6/2005 | Burgess |
| 7,146,063 B2 | 12/2006 | Seaman et al. |
| 8,417,000 B1 | 4/2013 | Mendis |
| 8,983,228 B1 * | 3/2015 | Shynar et al. ................. 382/276 |
| 2004/0190379 A1 | 9/2004 | Akiba |
| 2005/0018998 A1 * | 1/2005 | Tunney ........................... 386/46 |
| 2005/0104976 A1 | 5/2005 | Currans |
| 2005/0110880 A1 | 5/2005 | Parulski et al. |
| 2005/0151849 A1 | 7/2005 | Fitzhugh et al. |
| 2006/0200475 A1 | 9/2006 | Das et al. |
| 2007/0089060 A1 | 4/2007 | Shirasaka |
| 2008/0125996 A1 | 5/2008 | Fitzhugh |
| 2009/0136159 A1 | 5/2009 | Guan |
| 2010/0289921 A1 | 11/2010 | Napoli et al. |
| 2011/0310708 A1 * | 12/2011 | Chen ............................... 368/46 |

OTHER PUBLICATIONS

Serrano et al., "A Computationally Efficient Approach to Indoor/Outdoor Scene Classification", Proceedings of $16^{th}$ International Conference on Pattern Recognition, Quebec City Aug. 11-15, 2002, pp. 146-149.

(Continued)

*Primary Examiner* — Andrew W Johns
(74) *Attorney, Agent, or Firm* — Dority & Manning, P.A.

(57) ABSTRACT

Systems and methods are provided for using imagery depicting a timekeeping device to determine a clock offset for a particular image capture device. The clock offset can be used to correct timestamps associated with one or more images captured by such image capture device. One example method includes analyzing imagery depicting at least in part a timekeeping device to determine a first time displayed by the timekeeping device in the imagery. The method includes determining whether the first time comprises a 12-hour value or a 24-hour value. The method includes, when it is determined that the first time comprises a 12-hour value, determining a corresponding 24-hour value for the 12-hour value based at least in part on information contained within a plurality of images. The method includes determining a clock offset between the 24-hour value and the first timestamp. One example system includes a timestamp correction engine for correcting timestamps.

20 Claims, 6 Drawing Sheets

(56) References Cited

OTHER PUBLICATIONS

Forsythe et al., "A model comparison for daylength as a function of latitude and day of the year", Ecological Modelling 80 (1995) 87-95.
"Where was that photo taken? Deriving geographical information from image collections based on temporal exposure attributes," Frode Eika Sandnes, Multimedia Systems (2010) 16:309-318, Published online: May 14, 2010.
Michael Shynar, U.S. Appl. No. 13/484,407, filed May 31, 2012, Systems and Methods for Automatically Adjusting the Temporal Creation Data Associated with Image Files.

* cited by examiner

CREATING CAMERA CLOCK TRANSFORMS FROM IMAGE INFORMATION

FIELD

The present disclosure relates generally to using imagery depicting timekeeping devices to correct image timestamps. In particular, the present disclosure relates to using imagery depicting a timekeeping device to determine a clock offset for a particular image capture device that can be used to correct timestamps associated with one or more images captured by such image capture device.

BACKGROUND

Many image capture devices, such as cameras, include internal clocks that can be used to provide a timestamp indicating a particular time at which an image was captured by the image capture device. For example, the timestamp can be "stamped" upon the image or can be stored as metadata (e.g. EXIF data) along with the image.

Frequently, however, the owner or user of the image capture device does not properly or accurately set the internal clock of the image capture device. For example, the device may have an unfamiliar or complicated user interface that prevents the user from performing the necessary operations to correctly set the clock of the image capture device. As a result of the internal clock of the image capture device being incorrect, the timestamps provided for images captured by the device are also incorrect.

Furthermore, it can be desirable to correlate or otherwise align an image with other external data collected by a second device, such as, for example, a mobile phone collecting location data via a GPS system. However, incorrect timestamps make such correlation difficult, for example, by providing an incorrect correlation or alignment.

SUMMARY

Aspects and advantages of the present disclosure will be set forth in part in the following description, or may be apparent from the description, or may be learned through practice of embodiments of the present disclosure.

One example aspect of the present disclosure is directed to a computer-implemented method for correcting image timestamps. The method includes obtaining, by one or more computing devices, a first image from among a plurality of images. The first image includes imagery depicting at least in part a timekeeping device. A first timestamp is associated with the first image. The first timestamp indicates an internal time of an image capture device when the image capture device captured the first image. The method includes analyzing, by the one or more computing devices, the imagery depicting at least in part the timekeeping device to determine a first time displayed by the timekeeping device in the imagery. The method includes determining, by the one or more computing devices, whether the first time comprises a 12-hour value or a 24-hour value. The method includes, when it is determined that the first time comprises a 12-hour value, determining, by the one or more computing devices, a corresponding 24-hour value for the 12-hour value based at least in part on information contained within the plurality of images. The method includes determining, by the one or more computing devices, a clock offset between the 24-hour value and the first timestamp. The method includes adjusting, by the one or more computing devices, a plurality of timestamps by the clock offset. The plurality timestamps are respectively associated with the plurality of images captured by the image capture device.

Another example aspect of the present disclosure is directed to one or more non-transitory computer-readable media storing instructions that, when executed by one or more processors, cause the one or more processors to perform operations. The operations include identifying an image that depicts a clock, wherein the image was captured by an image capture device. The operations include analyzing the image to determine a time displayed by the clock. The operations include, when the time is a 12-hour value, determining an inclination of the sun depicted in the image or depicted in another image captured by the image capture device within a threshold period of time; determining a coarse location at which the image was captured; and determining a 24-hour value for the 12-hour value based at least in part on the inclination of the sun and the coarse location. The operations include determining a clock offset between the 24-hour value and a timestamp associated with the image. The operations include adjusting a plurality of timestamps by the clock offset, wherein the plurality of timestamps are respectively associated with a plurality of images captured by the image capture device.

Another example aspect of the present disclosure is directed to a computing system for correcting image timestamps. The system includes one or more computing devices. The system includes one or more non-transitory computer-readable media storing instructions that, when executed by the one or more computing devices, cause the one or more computing devices to perform operations. The operations include obtaining a plurality of images captured by an image capture device, wherein a plurality of timestamps are respectively associated with the plurality of images. The operations include identifying a first image of the plurality of images that includes imagery depicting at least in part a timekeeping device. The operations include determining a first time displayed by the timekeeping device in the first image. The operations include disambiguating between an AM version of the first time and a PM version of the first time based at least in part on location information associated with the first image. The operations include determining an offset between the first time and the timestamp of the first image. The operations include adjusting the plurality of timestamps by the offset.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Overview

Figure 1:
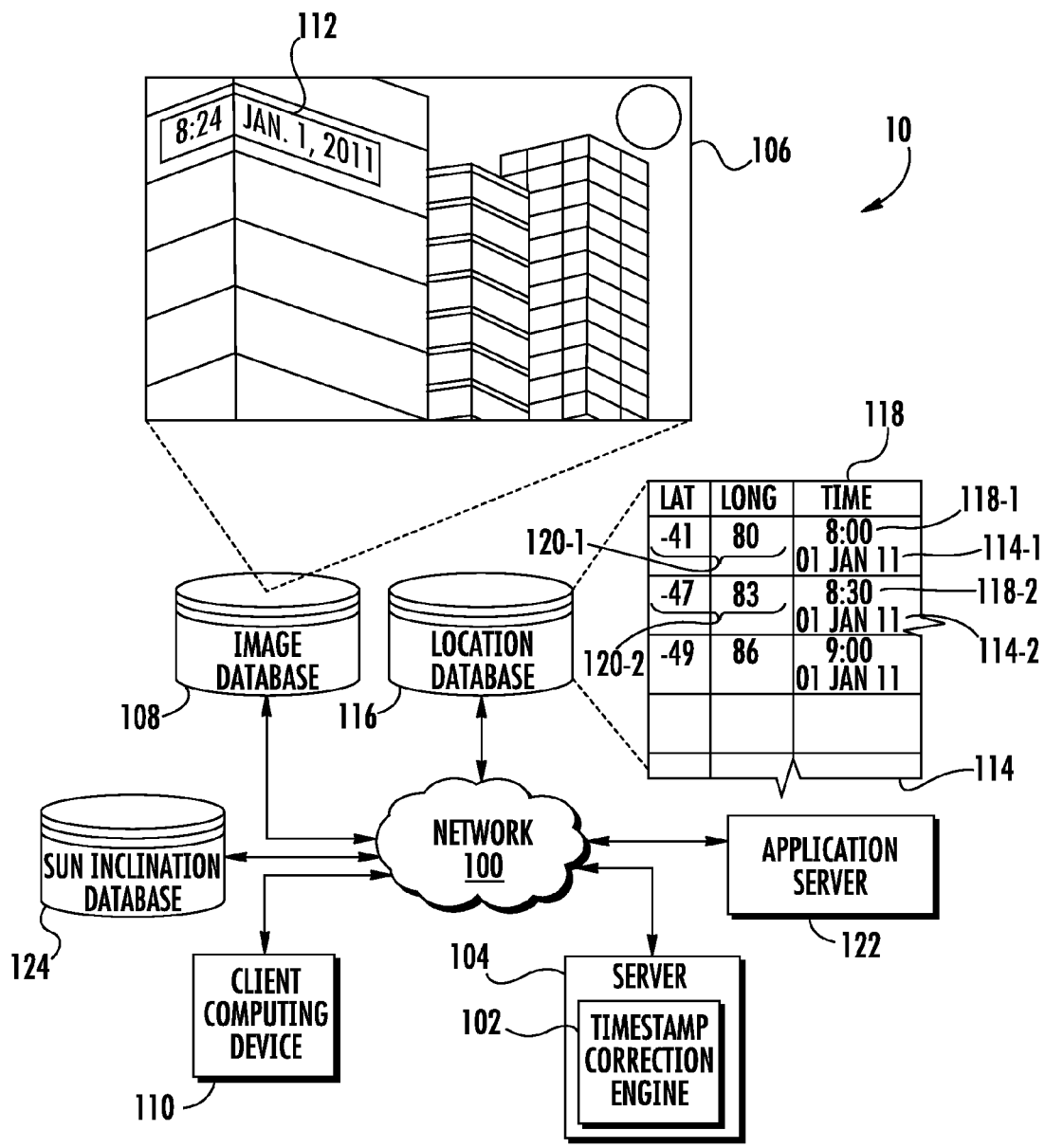
FIG. 1 depicts an example system for correcting timestamps according to an example embodiment of the present disclosure.

The present disclosure is directed to systems and methods for using imagery depicting timekeeping devices to correct image timestamps. In particular, imagery depicting a timekeeping device can be used to determine a clock offset for a particular image capture device that can be used to correct timestamps associated with one or more images captured by such image capture device. For example, a user can employ a camera or other image capture device to capture a plurality of images during a vacation or other time frame. However, the internal clock of the camera may be inaccurate. Therefore, the timestamps associated with such images may be incorrect. The systems and methods of the present disclosure can leverage imagery of a timekeeping device contained in one of such images captured by the camera with the incorrect internal clock to determine a clock offset between the internal clock of the camera and the actual time of image capture. The determined clock offset can then be used to correct the timestamp associated with each the plurality of images captured by the camera. In such fashion, imagery depicting timekeeping devices can be used to improve the accuracy of image timestamps. Further, an improved correlation between the images and other time-specific data can be formed on the basis of the improved timestamps.

More particularly, a system implementing the present disclosure can obtain a plurality of images captured by a particular image capture device. For example, the images may be uploaded to a system implementing the present disclosure by a user that captured the images. Alternatively, techniques described herein can be internally implemented by the image capture device itself.

Each of the plurality of images can include a timestamp that indicates an internal time of the image capture device at the instant in which such image was captured. For example, the timestamp can be "stamped" onto the image or can be included in metadata associated with the image, such as EXIF data. However, as noted above, the timestamps for the images can contain some amount of inaccuracy.

A first image that can include imagery depicting a timekeeping device can be identified. For example, each image can be analyzed using object segmentation/recognition techniques, optical character recognition techniques, other computer vision techniques, or combinations thereof to identify an image that can include imagery depicting a timekeeping device. For example, the timekeeping device can be a digital clock, an analog clock, or some other form of observable timekeeping device (e.g. sundial).

The first image can be analyzed to determine a first time that is displayed by the timekeeping device in the imagery. For example, the first image can be analyzed using object segmentation/recognition techniques, optical character recognition techniques, or other computer vision techniques, or combinations thereof to determine the first time displayed by the timekeeping device.

However, in some instances, the first time can be formatted as a 12-hour value. For example, if the timekeeping device is an analog clock or is a digital clock that shows a time less than 13:00, then the first time can be ambiguous with regards to whether it is an AM time or a PM time. Therefore, according to an aspect of the present disclosure, information contained within the images can be used to disambiguate the first time into a 24-hour value.

As an example, in some embodiments of the present disclosure, an inclination of the sun depicted in the first image can be used to determine a corresponding 24-hour value for the 12-hour value displayed by the timekeeping device. For example, the inclination of the sun depicted in the first image can be used to assist in selecting between an AM value or a PM value for the 12-hour value displayed by the timekeeping device.

More particularly, in some embodiments, a location at which the first image was captured can be determined. In some embodiments, the location can be a coarse location such as a combination of a time zone and equatorial hemisphere (e.g. Northern vs. Southern Hemisphere). The inclination of the sun depicted in the first image can be compared to an expected AM sun inclination and an expected PM sun inclination for the determined location. An AM value or a PM value can be selected for the 12-hour value based at least in part on such comparison. For example, the expected AM and PM sun inclinations can be retrieved from a database providing expected sun inclination values for various time, date, and location combinations.

As an example, the location at which the first image was captured can be determined by obtaining time-indexed location data associated with a user of the image capture device. For example, in some embodiments, the time-indexed location data can be GPS data associated with the image capture device. In other embodiments, the time-indexed location data can be GPS data associated with a second, different device associated with the user.

The time-indexed location data can be consulted to determine one or more locations specified by the time-indexed location data at one or more instances of the 12-hour value. For example, locations respectively specified by the time-indexed location data for each of the AM value and PM value can be determined. If the locations are in agreement on a coarse location, then such coarse location can be used as the location at which the first image was captured.

As another example, determining the location at which the first image was captured can include identifying one or more landmarks depicted by the first image. A location associated with the one or more identified landmarks can be used as the location at which the first image was captured.

As noted above, the location of capture of the first image can be used to obtain expected sun inclination values for use in disambiguating a 12-hour value into a 24-hour value. Alternatively, the location of capture can be matched against time-indexed location data from another source to disambiguate the 12-hour clock. For example, if the time-indexed location data associated with the user indicates that the user was at the location of capture during the morning but not during evening, then the AM value and the selected as the 24-hour value.

Once the first time has been disambiguated into a 24-hour value, the clock offset between the 24-hour value and the timestamp of the first image can be determined, For example, the clock offset can be the difference between the 24-hour value and the timestamp.

The timestamp associated with one or more of plurality of images captured by the image capture device can be adjusted or otherwise corrected using the clock offset. For example, the clock offset can be applied to the timestamps for every image captured by the image capture device. However, in some embodiments, the clock offset can be applied to only timestamps associated with selected images of the plurality of images.

As an example, in some embodiments, the plurality of images can be clustered or otherwise grouped based at least in part on one or more trends exhibited by a device photo capture history associated with the image capture device. For example, the plurality of images can be clustered based on time, location, frequency of capture, other parameters, or combinations thereof. As an example, only timestamps associated with images captured by the image capture device within a threshold period of time or within a threshold distance from the first image can be adjusted using the clock offset. Thus, for example, only timestamps associated with images captured by the image capture device while the user was on a particular vacation can be adjusted using the clock offset.

In such fashion, systems and methods of the present disclosure can leverage imagery depicting a timekeeping device included in a single image to correct timestamps associated with a plurality of images captured by a particular image capture device. Further, the improved timestamps can be used as a basis for an improved correlation between the images and other time-specific data such as, for example, location, image pose, depicted users, or other information.

Example Systems

FIG. 1 illustrates an example computing environment in which a timestamp correction system 10 can be implemented. The timestamp correction system 10 can include a timestamp correction engine 102, which can be implemented in a server 104 as a series of computer-executable instructions stored on a computer-readable medium such as a disk, for example.

The server 104 can be one server computing device or a plurality of server computing devices that are operably connected. In the instance in which server 104 is implemented by a plurality of servers, the plurality of servers can operate according to a parallel computing architecture, a sequential computing architecture, or a combination thereof.

The timestamp correction system 10 can also include an image database 108 to store images, which can come from any suitable manual or automated source. For example, users can upload individual pictures or photo albums to the image database 108 via desktop computers, handheld devices such as smartphones, various online services, etc.

Each of the images stored in image database 108 can have an associated timestamp. The timestamp for each image can indicate the internal time of an image capture device at the time the image was captured. For example, the timestamp can be stamped upon the image or can be stored as metadata (e.g. EXIF data) along with the image in image database 108. According to the present disclosure, timestamp correction engine 102 can operate to correct or otherwise improve one or more timestamps associated with one or more images stored in image database 108.

The images can be digital images captured using a digital image capture device or scans of film images. In general, images in the image database 108 can conform to any suitable digital format, including Joint Photographic Experts Group format (JPEG), Graphics Interchange Format (GIF), and Tagged Image File Format (TIFF).

Further, in some embodiments, the timestamp correction system 10 can include, or co-operate with, a location database 116 that stores users' time-indexed location history. In an example implementation, user's time-indexed location history is made up of a series of records, each including GPS coordinates (latitude, longitude, and, in some cases, elevation) and a time indication. For example, the location history can be built by or supplemented with updates from one or more mobile devices associated with the particular user.

A user can interact with the timestamp correction engine 102 via a client computing device 110. More particularly, the user can instruct the timestamp correction engine 102, via the client computing device 110, to correct a timestamp associated with an image 106. In some implementations, the timestamp correction system 10 requires that the user supply his or her logon credentials such as a user name, email address, password, etc. The user in general can refer to the image 106 individually or as a part of a group of images, e.g., a photo album. For example, the user can wish to obtain corrected timestamps for a series of images the user captured at various places during a trip and uploaded to the image database 108.

In the example of FIG. 1, the timestamp correction engine 102 can detect a timekeeping device (e.g. electronic ticker 112) in the image 106 that indicates time t. More specifically, the timestamp correction engine 102 can automatically recognize alphanumeric characters in the image 106, process the alphanumeric characters to obtain the character string displayed by the electronic billboard (in this case, "8:24 Jan. 1, 2011"), and automatically recognize that the character string can be an indication of time and date.

As an even more specific example, the timestamp correction engine 102 can be configured to recognize a text pattern that can include a number between 0 and 24 followed by a colon and another number between 0 and 60 as an indication of time. A fully spelled-out name of a month or an abbreviated name of a month followed by a number between 0 and 31 can be recognized as an indication of a date.

In general, however, the timestamp correction engine 102 can be configured to recognize any suitable format of time indication (or multiple such formats). The timestamp correction engine 102 can ask the user to confirm that image 106 in fact includes a time and date, in some implementations. The timestamp correction engine 102 can then use the time t to assist in correcting the timestamp associated with image 106 and/or one or more other images in image database 108.

In general, examples of timekeeping devices indicating time similar to the electronic ticker 112 include digital clocks, analog clocks, screens or monitors displaying time and/or date, etc. In some instances, the timestamp correction engine 102 can include software modules to perform identification of timekeeping devices indicating the time t. For example, the software modules can be implemented to perform optical character recognition, object segmentation, object recognition, analog clock reading, or other computer vision functions.

In other instances, the timestamp correction engine 102 can transmit a request to an application (collocated with the timestamp correction engine 102 at server 104 or disposed on the application server 122, for example) to perform identification of objects in the image indicating the time t. The timestamp correction engine 102 can include a reference to the image or a data file corresponding to the image with the request.

The timestamp correction engine 102 can determine whether the time t indicated by the electronic ticker 112 is a 12-hour value or a 24-hour value. Generally, 12-hour values are time values that do not, on their face, provide information concerning whether the time is an AM time or a PM time. For example, a 12-hour value can be a number between 0 and 12 followed by a colon and another number between 0 and 60. Times obtained from analog clocks are typically 12-hour values.

On the other hand, 24-hour values are time values that provide information concerning whether the time is an AM time or a PM time. For example, a 24-hour value can be a number between 13 and 24 followed by a colon and another number between 0 and 60. As another example, a 24-hour value can be a number between 0 and 12 followed by a colon and another number between 0 and 60 followed by a textual or graphical indication of either AM or PM. Other designations may be used to indicate that a certain time value is a 24-hour value. For example, in some embodiments, if a time value is obtained that includes a zero prior to a number between 0 and 9 followed by a colon and a number between 0 and 60 (e.g. 08:30), then it can be assumed that such time value is a 24-hour value.

When timestamp correction engine 102 determines that the time t displayed within the image 106 is a 12-hour value (e.g. 8:24), then timestamp correction engine 102 can determine a corresponding 24-hour value for the 12-hour value based at least in part on information contained within images stored in image database 108 and/or location data stored within location database 116. For example, timestamp correction engine 102 can use people, places, scenes, or environmental attributes (e.g. inclination of the sun) depicted within the images or stored as metadata with the images to disambiguate the 12-hour value into a 24-hour value. In some embodiments, timestamp correction engine 102 can perform any of methods (300), (400), (500), and/or (600) respectively of FIGS. 3, 4, 5, and 6 to assist in correcting timestamps for images.

In particular, in some embodiments, timestamp correction engine 102 can include or communicate with a sun inclination database 124. Sun inclination database 124 can store and/or provide information concerning expected sun inclinations for given combinations of location, time of day, and/or date or time of year. For example, timestamp correction engine 102 can query sun inclination database 124 to obtain an expected AM sun inclination and an expected PM sun inclination for a given location and 12-hour value. In some embodiments, the location used to obtain information from database 124 can be a coarse location such as a state, a time zone, or a region. In other embodiments, a web-service, a web-search engine, or a dedicated application can be used to obtain expected sun inclinations for various locations.

The sun inclinations can be described in terms of degrees from horizon, zenith angle, or other formats. In some embodiments, an expected directionality (e.g. North by North-West, etc.) of the sun from the location can be provided as well. Timestamp correction engine 102 can use the expected sun inclinations to assist in disambiguating a 12-hour value into a 24-hour value, as will be discussed further below.

Once the first time has been disambiguated into a 24-hour value, the timestamp correction engine 102 can determine a clock offset between the 24-hour value and the timestamp associated with image 106. For example, the clock offset can be the difference between the 24-hour value and the timestamp associated with image 106.

Timestamp correction engine 102 can adjust or correct timestamps associated with one or more of the other images stored in image database 108 using the clock offset. For example, the clock offset can be applied to the timestamps for every image captured by the same image capture device and stored in database 108. However, in some embodiments, the clock offset can be applied to only timestamps associated with images that are within the same photo album as image 106, or otherwise captured within a threshold time and/or threshold distance from image 106. Thus, for example, only timestamps associated with images captured by the same image capture device while the particular user was on a particular vacation can be adjusted by timestamp correction engine 102 using the clock offset.

In further embodiments, the corrected timestamps for the images can be used to correlate such images with other external data collected by a second device. As an example, timestamp correction engine 102 can receive a time-indexed location history 114 for a certain user upon determining that the user has granted his or her permission thereto. As previously indicated, the timestamp correction system 10 can require that the user supply his or her login credentials, which the timestamp correction engine 102 can utilize to receive the user's time-indexed location history 114. The time-indexed location history of several users can be stored in the location database 116, which in some cases can be maintained independently of the timestamp correction system 10. The time-indexed location history 114 for a user can include a series of records 114-1, 114-2, . . . 114-N. A record 114-1, for example, can include location information for the user in the form of latitude and longitude data. The record 114-1 also can include a time mark 118-1. In essence, the record 114-1 indicates that the user was (at least) approximately at the location corresponding to latitude and longitude 120-1 at the time corresponding to time mark 118-1.

As an example, timestamp correction engine 102 can correlate an image to the location data by comparing the corrected timestamp for a given image to one or several time marks 118 in the time-indexed location history 114. For example, the timestamp correction engine 102 can determine that the corrected timestamp is temporally closest to the time mark 118-2. The timestamp correction engine 102 accordingly can generate an index into the record 114-2 and associate the latitude/longitude 120-2 with the image. For example, the timestamp correction engine 102 can generate a corresponding location indication (e.g., a string of alphanumeric characters) and, depending on the implementation or scenario, provide the location indication to the user via the corresponding client device, store the location indication in a separate database, etc. As another alternative, the timestamp correction engine 102 can interleave the location indication into the digital record (e.g. as metadata) corresponding to the image 106 and store the updated digital record in a memory.

In some scenarios, the timestamp correction engine 102 can utilize a map database (not shown) to determine a street/postal address corresponding to the latitude and longitude coordinates of the location where the image was captured. The timestamp correction engine 102 then can associate the image 106 with the determined street/postal address and, in some cases, update the appropriate fields of data structure storing metadata for the image 106. In some implementations, the timestamp correction system 10 also can include a database storing location information for landmark structures.

The image database 108 and the location database 116 can be implemented in any suitable manner such as using relational database techniques, for example. Although in some implementations, the location database 116 is stored on one or several stationary devices (e.g., a server or server farm), the location database 116 also can be implemented in a portable device. For example, the user can utilize a GPS tracking device to record his or her location at different times. The user can upload time-indexed location information stored in the GPS tracking device to the location database 116, or the GPS tracking device can operate as the database 116. As another example, the location database 116 can be associated with a service that maintains location data which users voluntarily submit at periodic intervals or at designated locations (by "checking in," for example).

In one embodiment, the timestamp correction engine 102 can be available at an online application store disposed at the server 104 or the application server 122, for example. A user can retrieve a copy of the timestamp correction engine 102 from the server 104 and "install" the retrieved copy of the timestamp correction engine 102 on the client computing device 110. The client computing device 110 can be a tablet, desktop, net-book or laptop computer. Alternatively, the client computing device 110 can be a smartphone.

Example Images

Figure 2A:
FIGS. 2A and 2B depict example images according to an example embodiment of the present disclosure.
Figure 2B:
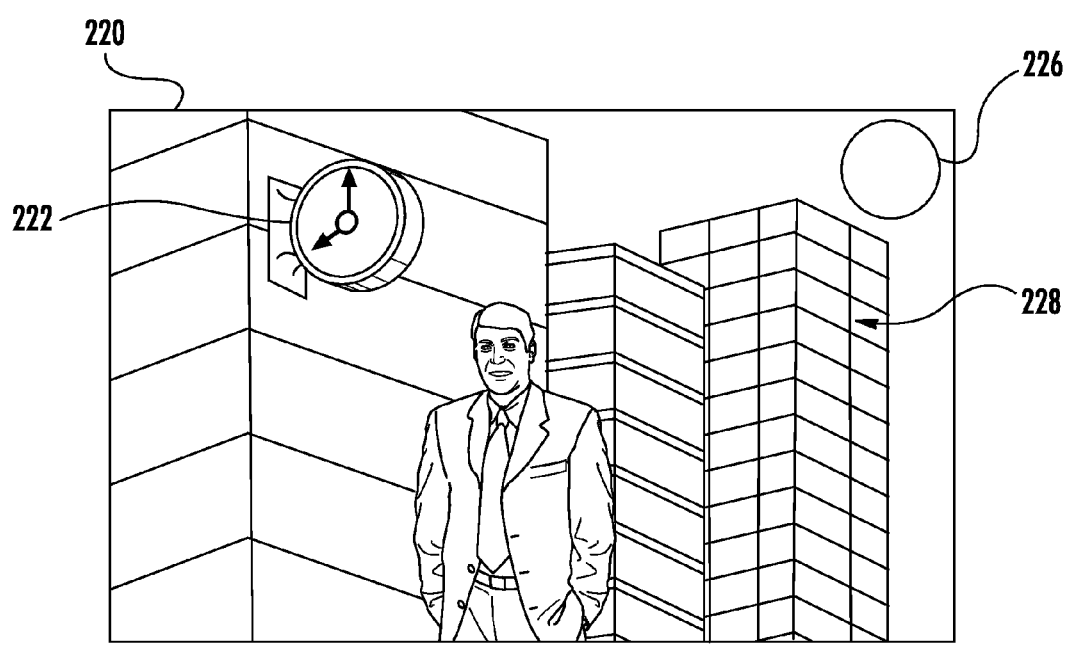

FIGS. 2A and 2B provide examples of images on which the timestamp correction engine 102 can operate to correct associated timestamps. As discussed in more detail below, each of these images can include features which the timestamp correction engine 102 can recognize and utilize to determine a true time at which the image was captured. A camera clock offset can be determined based on a difference between such true time and the image timestamp and can be applied to other images captured by the same device.

FIG. 2A is an example image 210 on which the timestamp correction engine 102 can operate to correct its associated timestamp. In particular, the timestamp correction engine 102 can identify features such as a timekeeping device (e.g. electronic ticker 212) indicating a time t in the image 210. The time t can evidence a true time at which image 210 was captured. However, as shown illustrated by FIG. 2A, the time t can be a 12-hour value that is ambiguous with respect to whether it is an AM or a PM value.

According to an aspect of the present disclosure, the time t can be disambiguated into a 24-hour value based at least in part on information contained within the image 210 or other available information. As an example, in some embodiments, an inclination of the sun 216 depicted by the image 210 can be used to disambiguate the time t. For example, the inclination of the sun 216 depicted in the image 210 can be used to assist in selecting between an AM value or a PM value for the 12-hour value displayed by the timekeeping device 212.

As another example, in some embodiments, the timestamp correction engine 102 can identify an individual 214 in the image 210, provided the proper consent has been obtained. For example, the timestamp correction engine 102 can then retrieve time-indexed location information for the identified individual 214 from a location database and use such information to assist in correcting the timestamp for image 210.

For example, the time-indexed location information for the user 214 depicted in the image 210 may indicate that at both the AM and PM version of time t, the user was at location L1. As such, the timestamp correction engine 102 can use location L1 to assist in disambiguating time t. For example, expected AM and PM sun inclinations can be obtained for location L1 and can be compared to the inclination of the sun 216 depicted in image 210 to assist in disambiguating the time t into a 24-hour value.

FIG. 2B is another example image 220 on which the timestamp correction engine 102 may operate. Image 220 is similar to the image 210 discussed above, except that the image 220 can include an analog clock 222. The timestamp correction engine 102 may identify the time t depicted on the face of the analog clock 222 and associate the identified time with the time when the image 220 was captured. In this case, the timestamp correction engine 102 can include image recognition software modules adapted to perform the identification and conversion of the time depicted on the face of the analog clock 222 to a numeric representation.

Similar to the example discussed above, when operating on the image 220, the timestamp correction engine 102 may identify the user depicted in the image 220, receive time-indexed location information for the identified user, identify one or more locations in the time-indexed location information that have a time mark that correlates to the time shown on the face of the analog clock 222, and use the one or more identified locations to assist in disambiguating the time t.

As an example, in some embodiments, the timestamp correction engine 102 can identify a landmark structure 228 in the image 220. Identifying a landmark structure 228 can include recognizing features or properties such as the outlines, shapes, color, etc. that characterize a particular landmark structure. The timestamp correction engine 102 can include, or cooperate with via appropriate application programming interfaces (APIs), landmark recognition software such as that utilized by such applications as Google Goggles, for example, to perform the automatic identification of landmark structures.

In some embodiments, the timestamp correction engine 102 can determine the name of the landmark structure 228 and use the name of the landmark structure 228 to retrieve the location of the landmark structure 228 from a special-purpose landmark database that includes a list of landmark structures and the corresponding location data. Alternatively, the timestamp correction engine 102 can use a web service made accessible via a corresponding API.

Alternatively, the timestamp correction engine 102 can transmit a request to an application to perform the identification of any landmark structures in the image 200. The request can be transmitted by invoking the requisite API function of the application. In this scenario, the timestamp correction engine 102 can provide the application with a reference or link to the image 200. The timestamp correction engine 102 can receive the location information of the identified landmark 228 from the application.

The location information received for the identified landmark structure 228 can include the latitude/longitude coordinates of the landmark structure 228. Alternatively, the location information for the landmark structure 228 can be received as a postal/street address.

The location of the landmark structure 228 can be used as the location of the image 220 for the purposes of disambiguating the time shown by the analog clock 222. As an example, in some embodiments, an expected AM sun inclination and an expected PM sun inclination can be obtained for the location of the landmark structure 228. The expected AM and PM sun inclinations can be then compared to an inclination of the sun 226 depicted in the image 220 to assist in selecting an AM value or a PM value for the time shown by the analog clock 222.

As another example, in some embodiments, the time-indexed location data for the user depicted in image 220 can be used in combination with the location of the landmark structure 228 to disambiguate the time value shown in the image. For example, if the time-indexed location data associated with the user shown in image 220 or otherwise associated with image 220 indicates that the user was at the location of the landmark structure 228 during the morning but not during evening, then the AM value and the selected as the 24-hour value for the time depicted in the image 220.

Example Methods

Figure 3:
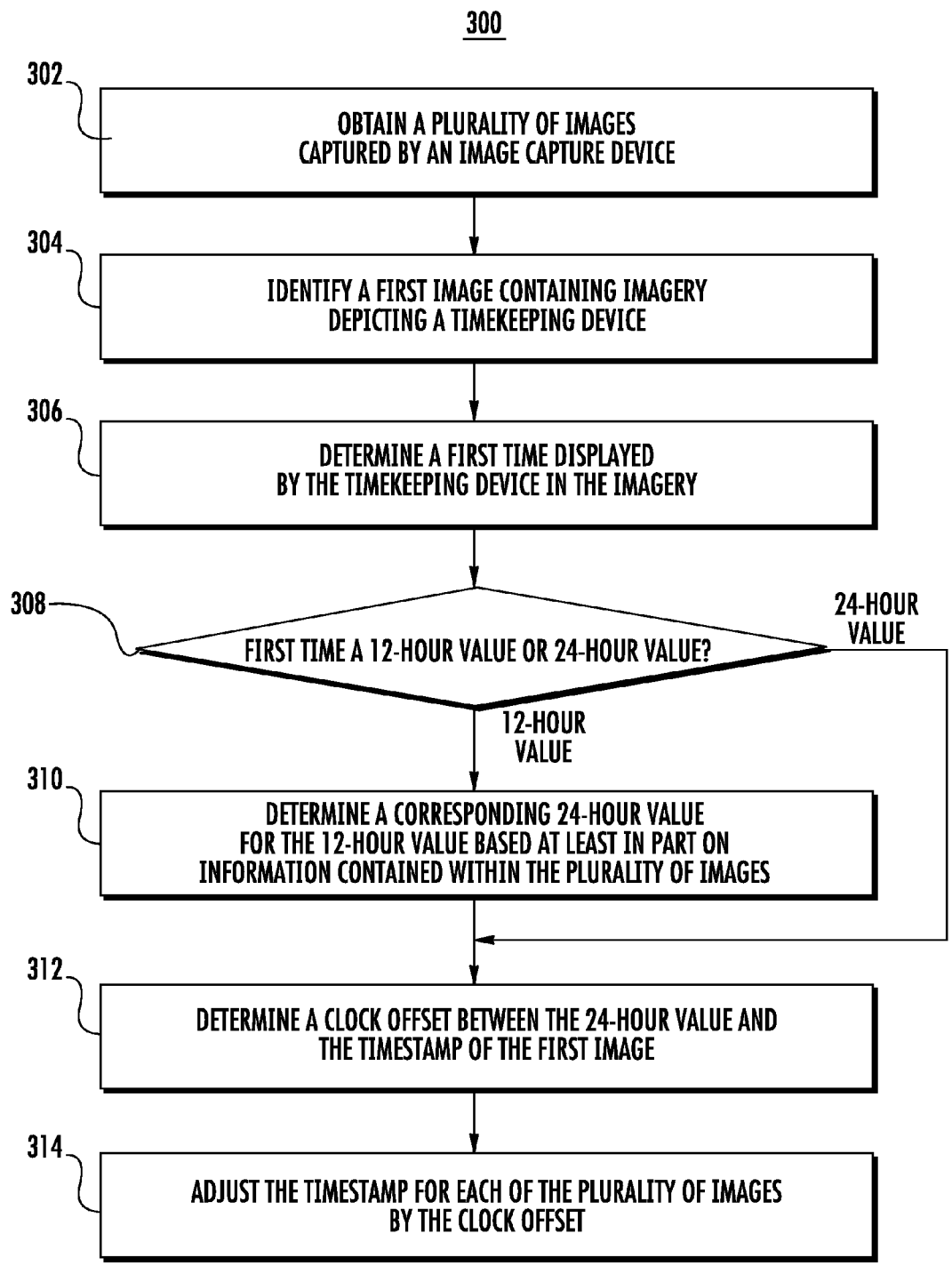
FIG. 3 depicts a flow chart of an example method for correcting timestamps according to an example embodiment of the present disclosure.

FIG. 3 depicts a flow chart of an example method (300) for correcting timestamps according to an example embodiment of the present disclosure. Although FIG. 3 depicts steps performed in a particular order for purposes of illustration and discussion, various steps of method (300) can be omitted, rearranged, combined, and/or adapted in various ways without deviating from the scope of the present disclosure.

At (302) a plurality of images captured by an image capture device can be obtained. For example, the images may be uploaded to a system implementing the present disclosure by a user that captured the images. Alternatively, techniques described herein can be internally implemented by the image capture device itself. In some embodiments, the set of images obtained at (302) can be limited to images captured by a particular device, images captured within a threshold time and/or location from each other, images that belong to a user-defined album, or some combination of such parameters.

Each of the plurality of images can include a timestamp that indicates an internal time of the image capture device at the instant in which such image was captured. For example, the timestamp can be "stamped" onto the image or can be included in metadata associated with the image, such as EXIF data. However, as noted above, the timestamps for the images can contain some amount of inaccuracy.

At (304) a first image containing imagery depicting a timekeeping device can be identified. For example, each of the plurality of images obtained at (302) can be analyzed using object segmentation/recognition techniques, optical character recognition techniques, other computer vision techniques, or combinations thereof to identify an image that can include imagery depicting a timekeeping device. For example, the timekeeping device can be a digital clock, an analog clock, or some other form of observable timekeeping device (e.g. sundial).

At (306) a first time displayed by the timekeeping device in the first image can be determined. For example, the first image can be analyzed using object segmentation/recognition techniques, optical character recognition techniques, or other computer vision techniques, or combinations thereof to determine the first time displayed by the timekeeping device.

At (308) it can be determined whether the first time displayed by the timekeeping device in the imagery is a 12-hour value or a 24-hour value. Generally, 12-hour values are time values that do not, on their face, provide information concerning whether the time is an AM time or a PM time. For example, a 12-hour value can be a number between 0 and 12 followed by a colon and another number between 0 and 60. Times obtained from analog clocks are typically 12-hour values.

On the other hand, 24-hour values are time values that provide information concerning whether the time is an AM time or a PM time. For example, a 24-hour value can be a number between 13 and 24 followed by a colon and another number between 0 and 60. As another example, a 24-hour value can be a number between 0 and 12 followed by a colon and another number between 0 and 60 followed by a textual or graphical indication of either AM or PM. Other designations may be used to indicate that a certain time value is a 24-hour value. For example, in some embodiments, if a time value is obtained that includes a zero prior to a number between 0 and 9 followed by a colon and a number between 0 and 60 (e.g. 08:30), then it can be assumed that such time value is a 24-hour value.

Thus, at (308) the first time determined at (306) can be analyzed (e.g. compared to various available formats) to determine whether the first time is a 12-hour value or a 24-hour value. If it is determined at (308) that the first time is 24-hour value, then method (300) can proceed to (312). However, if it is determined at (308) that the first time is a 12-hour value, then method (300) can proceed to (310).

At (310) a corresponding 24-hour value can be determined for the 12-hour value. In particular, information contained within the plurality of images obtained at (302) can be used to disambiguate the first time into a 24-hour value.

Figure 4:
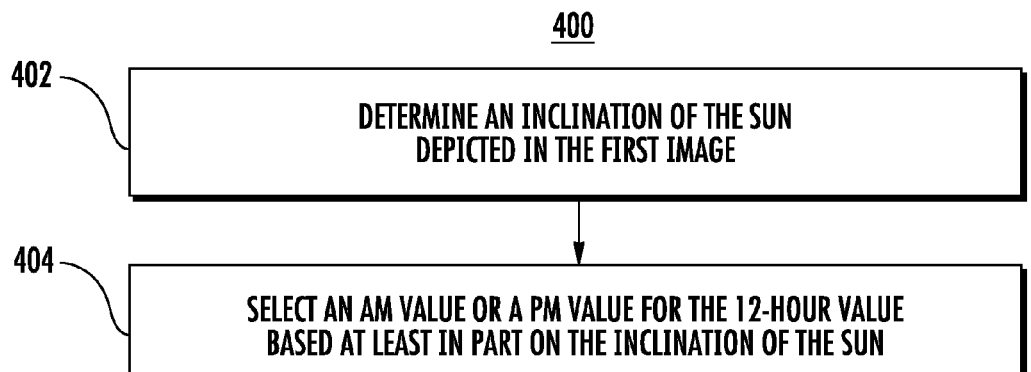
FIG. 4 depicts a flow chart of an example method for disambiguating 12-hour time values according to an example embodiment of the present disclosure.

As an example, FIG. 4 depicts a flow chart of an example method (400) for disambiguating 12-hour time values according to an example embodiment of the present disclosure. Although FIG. 4 depicts steps performed in a particular order for purposes of illustration and discussion, various steps of method (400) can be omitted, rearranged, combined, and/ or adapted in various ways without deviating from the scope of the present disclosure.

At (402) an inclination of the sun depicted in the first image can be determined. In some embodiments, parameters such as the position of a horizon in the image; a radius, diameter, or circumference of the sun as depicted in the image; a length of shadows relative to an objects generating such shadows; and/ or the relative position of the depicted sun with respect to the horizon can be determined and used to calculate the inclination of the sun depicted in the first image.

At (404) an AM value or a PM value for the 12-hour value can be selected based at least in part on the inclination of the sun determined at (402). As an example, if the 12-hour value is within certain ranges, the inclination of the sun may be sufficient information to disambiguate the 12-hour value. For example, if the 12-hour value ranges between 10:00-4:00 and the sun is at a moderate to high inclination, then it can be assumed that the 12-hour value is a daytime value (e.g. 10:00-11:59 AM, 12:00-4:00 PM). Likewise, if the 12-hour value ranges between 10:00-4:00 and the sun is at a very low inclination or is not present, the it can be assumed that the 12-hour value is a nighttime value (e.g. 10:00-11:59 PM, 12:00-4:00 AM). Other ranges can be used as well. In addition, for certain other ranges of times, additional information can be used to assist in disambiguating the 12-hour value, as will be discussed further below.

Figure 5:
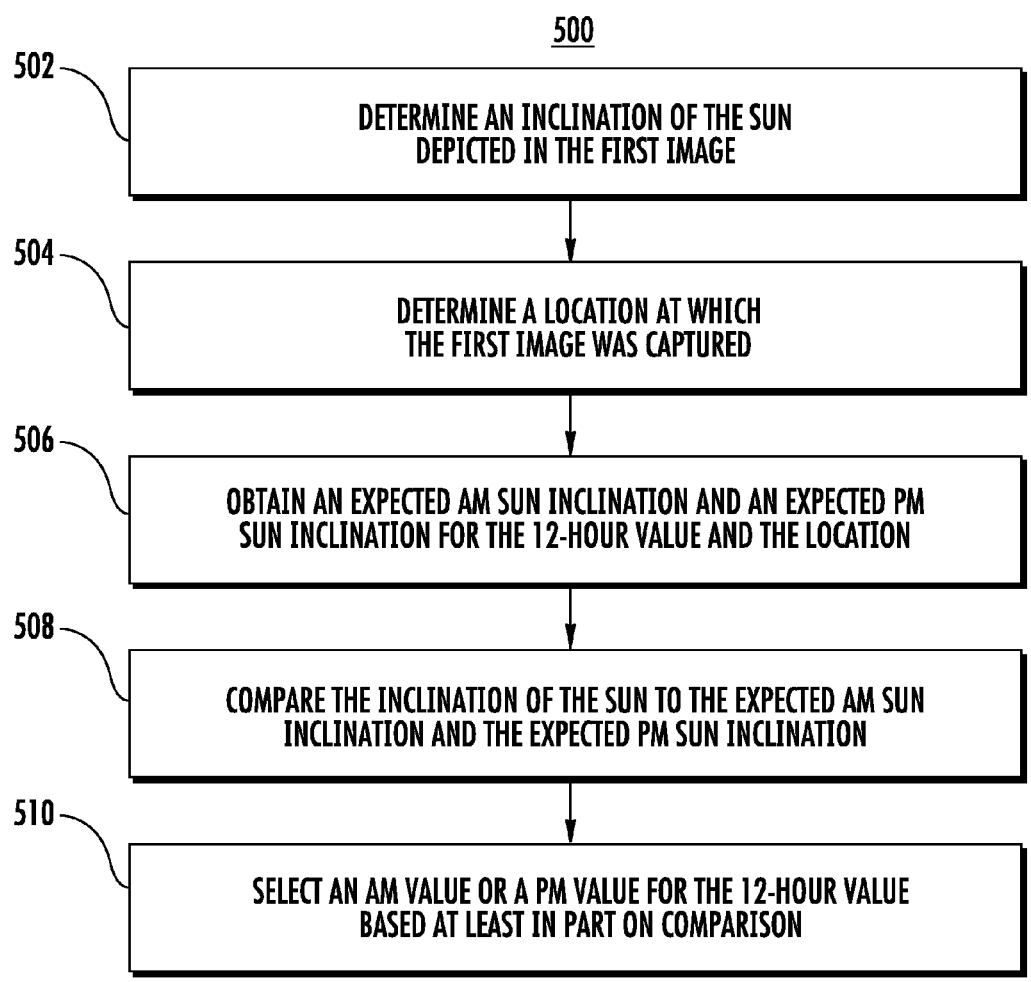
FIG. 5 depicts a flow chart of an example method for disambiguating 12-hour time values according to an example embodiment of the present disclosure.

As another example, FIG. 5 depicts a flow chart of an example method (500) for disambiguating 12-hour time values according to an example embodiment of the present disclosure. Although FIG. 5 depicts steps performed in a particular order for purposes of illustration and discussion, various steps of method (500) can be omitted, rearranged, combined, and/or adapted in various ways without deviating from the scope of the present disclosure.

At (502) an inclination of the sun depicted in the first image can be determined. In some embodiments, parameters such as the position of a horizon in the image; a radius, diameter, or circumference of the sun as depicted in the image; a length of shadows relative to an objects generating such shadows; and/ or the relative position of the depicted sun with respect to the horizon can be determined and used to calculate the inclination of the sun depicted in the first image.

At (504) a location at which the first image was captured can be determined. As an example, the location at which the first image was captured can be obtained from metadata associated with the image. For example, certain image capture devices include a GPS system or other positioning system for determining a current location of the image capture device. Then, when an image is captured, the image capture device stores the current location as metadata associated with the image. Thus, in some embodiments, the location at which the first image was captured can be obtained from the image metadata.

As another example, the location at which the first image was captured can be determined by obtaining time-indexed location data associated with a user of the image capture device. For example, in some embodiments, the time-indexed location data can be GPS data associated with the image capture device. In other embodiments, the time-indexed location data can be GPS data associated with a second, different device associated with the user (e.g. the user's smartphone).

The time-indexed location data can be consulted to determine one or more locations specified by the time-indexed location data at one or more instances of the 12-hour value. For example, locations respectively specified by the time-indexed location data for each of the AM version and PM version of the 12-hour value can be determined. If the locations are in agreement on a coarse location, then such coarse location can be used as the location at which the first image was captured. For example, if the first time shown in the image is 8:30 and the time-indexed location data indicates that the user was located in New York City at 8:30 AM and 8:30 PM, then New York City can be used as the location at which the image was captured.

As another example, determining the location at which the first image was captured can include identifying one or more landmarks depicted by the first image. Identifying a landmark structure can include recognizing features or properties such as the outlines, shapes, color, etc. that characterize a particular landmark structure. Landmark recognition software such as that utilized by such applications as Google Goggles, for example, can assist in performing the automatic identification of landmark structures.

In some embodiments, the name of the landmark structure can be used to retrieve the location of the landmark structure from a special-purpose landmark database that can include a list of landmark structures and the corresponding location data. Alternatively, a web service can be queried via a corresponding API.

Alternatively, a landmark identification request can be transmitted at (504) to an application to perform the identification of any landmark structures in the first image. The request can be transmitted by invoking the requisite API function of the application. In this scenario, the application can be provided with the first image or a reference or link to the first image. The location information of the identified landmark can then be received from the application.

The location information received for the identified landmark structure can include the latitude/longitude coordinates of the landmark structure. Alternatively, the location information for the landmark structure can be received as a postal/street address.

In some embodiments, only a coarse location is desired to be determined at (504). For example, the coarse location can be a state, time zone, hemisphere, region, city, or other generalized location.

Thus, various techniques for determining the location at which the first image was captured can be used. Combinations of such techniques can be used as well, either sequentially or in parallel. If a plurality of locations are determined, the locations can be averaged. Alternatively, the determined locations can be ranked according to confidence and the most confident location can be used.

At (506) an expected AM sun inclination and an expected PM sun inclination can be obtained for the 12-hour value and the location. For example, at (506) a data source storing or providing information concerning expected sun inclinations for given combinations of location, time of day, and/or date or time of year can be queried or otherwise communicated with. For example, the data source can be queried to obtain an expected AM sun inclination and an expected PM sun inclination for the location determined at (504) and the 12-hour value displayed within the first image. In some embodiments, the location can be a coarse location such as a state, a time zone, or a region.

The data source providing expected sun inclinations can be a local database, a web-service, a web-search engine, or a dedicated application. The sun inclinations can be described in terms of degrees from horizon, zenith angle, or other formats. In some embodiments, an expected directionality (e.g. North by North-West, etc.) of the sun from the location can be provided as well.

At (508) the inclination of the sun determined at (502) can be compared to the expected AM sun inclination and the expected PM sun inclination obtained at (506). For example, the comparison can performed at (508) by determining whether the inclination of the sun determined at (502) is closer to the expected AM sun inclination or the expected PM sun inclination. In some embodiments, the comparison can be a mathematical comparison of degrees of inclination. In other embodiments, a projection of the expected AM and expected PM sun inclinations onto the first image can be performed to assist in determining whether the inclination of the sun determined at (502) is closer to the expected AM sun inclination or the expected PM sun inclination.

In further embodiments, the directionality of the sun versus an expected directionality can also be considered in the comparison performed at (508). In addition, data describing a pose of the image can be taken into account when performing the comparison at (508) (e.g. when projecting expected inclinations onto the image or analyzing shadow length or directionality).

At (510) an AM value or a PM value can be selected for the 12-hour value based at least in part on the comparison performed at (508). For example, if the comparison revealed that the inclination of the sun determined at (502) is closer to the expected AM sun inclination for the location determined at (504), then at (510) the AM version of the 12-hour value can be selected. In such fashion, expected sun inclinations for a determined location of image capture can be used to disambiguate a 12-hour value.

Figure 6:
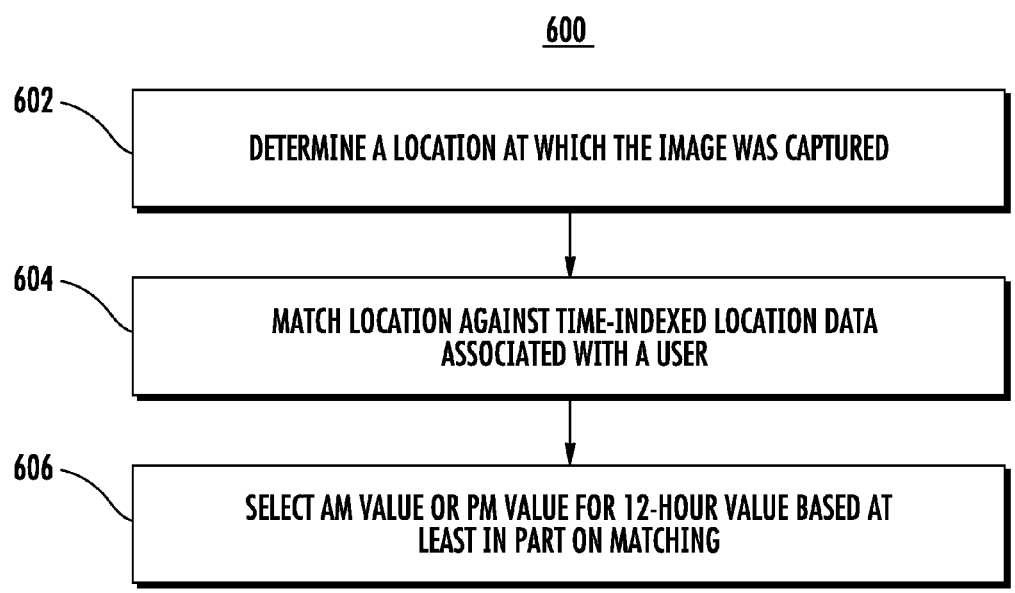
FIG. 6 depicts a flow chart of an example method for disambiguating 12-hour time values according to an example embodiment of the present disclosure.

As yet another example, FIG. 6 depicts a flow chart of an example method (600) for disambiguating 12-hour time values according to an example embodiment of the present disclosure. Although FIG. 6 depicts steps performed in a particular order for purposes of illustration and discussion, various steps of method (600) can be omitted, rearranged, combined, and/or adapted in various ways without deviating from the scope of the present disclosure.

At (602) a location at which the image was captured can be determined. As an example, the location at which the first image was captured can be obtained from metadata associated with the image. For example, certain image capture devices include a GPS system or other positioning system for determining a current location of the image capture device. Then, when an image is captured, the image capture device stores the current location as metadata associated with the image. Thus, in some embodiments, the location at which the first image was captured can be obtained from the image metadata at (602).

As another example, determining the location at which the first image was captured at (602) can include identifying one or more landmarks depicted by the first image. Identifying a landmark structure can include recognizing features or properties such as the outlines, shapes, color, etc. that characterize a particular landmark structure. Landmark recognition software such as that utilized by such applications as Google Goggles, for example, can assist in performing the automatic identification of landmark structures.

In some embodiments, the name of the landmark structure can be used to retrieve the location of the landmark structure from a special-purpose landmark database that can include a list of landmark structures and the corresponding location data. Alternatively, a web service can be queried via a corresponding API.

Alternatively, a landmark identification request can be transmitted at (602) to an application to perform the identification of any landmark structures in the first image. The request can be transmitted by invoking the requisite API function of the application. In this scenario, the application can be provided with the first image or a reference or link to the first image. The location information of the identified landmark can then be received from the application.

The location information received for the identified landmark structure can include the latitude/longitude coordinates of the landmark structure. Alternatively, the location information for the landmark structure can be received as a postal/street address.

Thus, various techniques for determining the location at which the first image was captured can be used. Combinations of such techniques can be used as well, either sequentially or in parallel. If a plurality of locations are determined, the locations can be averaged. Alternatively, the determined locations can be ranked according to confidence and the most confident location can be used.

At (604) the location determined at (602) can be matched against time-indexed location data associated with a user. For example, the time-indexed location data can be data obtained from another device associated with the user (e.g. GPS data from the user's smartphone). At (604) the location can be matched against the time-indexed location data to determine whether the user visited the location determined at (602) at one but not both of the AM and PM versions of the 12-hour value.

More particularly, as an example, if an analysis of the image has resulted in a determination that the image was captured in New York City at 8:30, then at (604) the time-indexed location data can be analyzed at (604) to determine if the user was located in New York City at either 8:30 AM or 8:30 PM, but not both.

The time-indexed location data used at (604) can be data associated with the user that uploaded or captured the image or can be data associated with a user depicted in the image. Although the example location of a city is provided, more specific or general locations can be used as well.

At (606) an AM value or a PM value can be selected for the 12-hour value based at least in part on the matching performed at (604). For example, if the location data indicates that the user was located in New York City at 8:30 AM but not 8:30 PM, then it can be assumed that the image was captured at 8:30 AM while the user was located at the location of image capture. In such fashion, location data associated with a user can be used to assist in disambiguating the 12-hour value into a 24-hour value.

Referring again to FIG. 3, once a 24-hour value for the first time has been obtained, then at (312) a clock offset between the 24-hour value and the timestamp of the first image can be determined. For example, the clock offset can be the difference between the 24-hour value and the timestamp.

At (314) the timestamp for each of the plurality of images can be adjusted by the clock offset. For example, the clock offset can be applied to the timestamps for every image captured by the image capture device. However, in some embodiments, the clock offset can be applied to only timestamps associated with selected images of the plurality of images.

As an example, in some embodiments, the plurality of images can be clustered or otherwise grouped based at least in part on one or more trends exhibited by a device photo capture history associated with the image capture device. For example, the plurality of images can be clustered based on time, location, frequency of capture, other parameters, or combinations thereof. As an example, only timestamps associated with images captured by the image capture device within a threshold period of time or within a threshold distance from the first image can be adjusted using the clock offset. Thus, for example, only timestamps associated with images captured by the image capture device while the user was on a particular vacation can be adjusted using the clock offset.

In such fashion, systems and methods of the present disclosure can leverage imagery depicting a timekeeping device included in a single image to correct timestamps associated with a plurality of images captured by a particular image capture device. Further, the improved timestamps can be used as a basis for an improved correlation between the images and other time-specific data such as, for example, location, image pose, depicted users, or other information.

Example Computing Device

Figure 7:
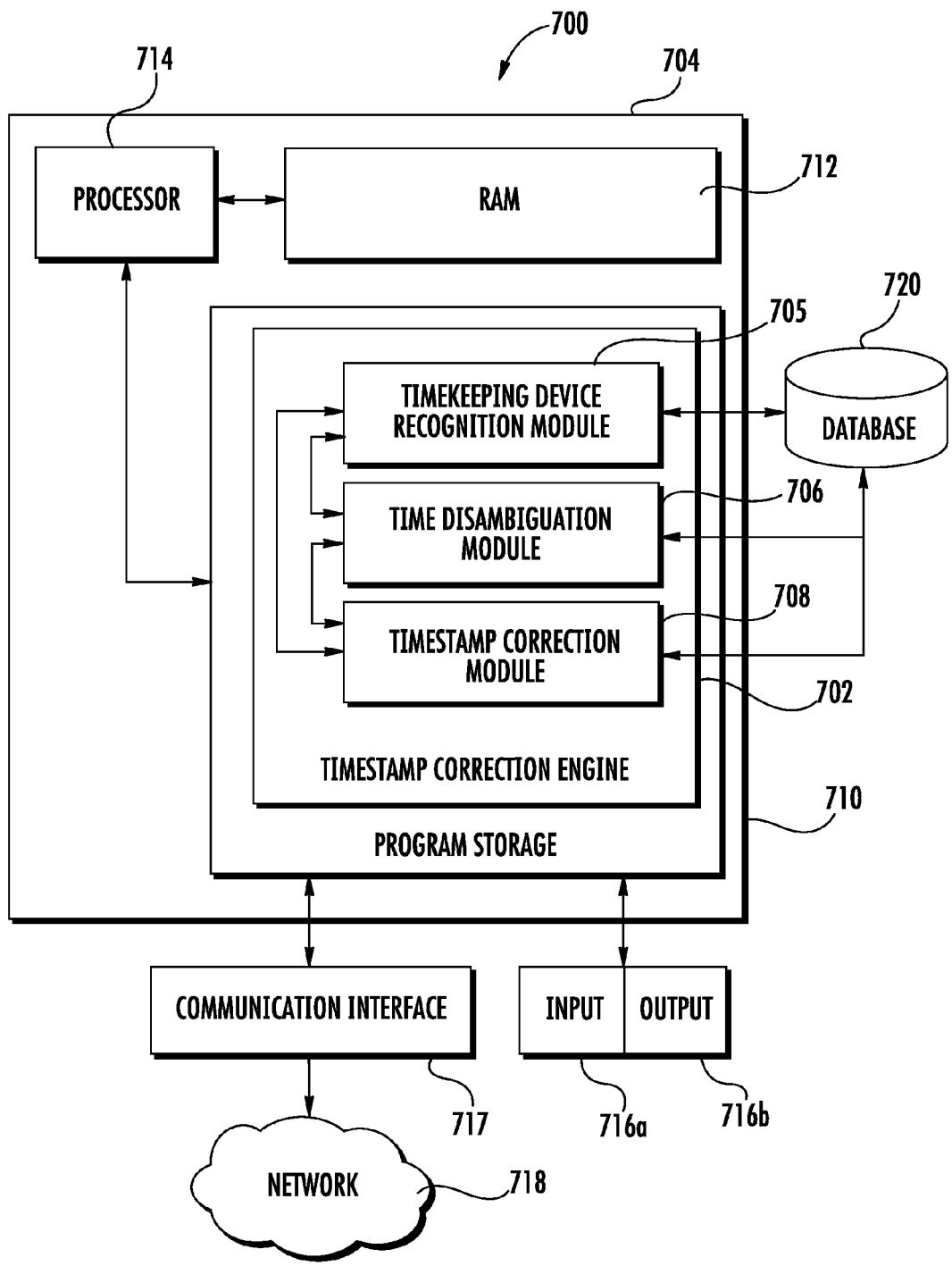
FIG. 7 depicts an example computing device for correcting timestamps according to an example embodiment of the present disclosure.

FIG. 7 is a block diagram of an example computing system 700 in which a timestamp correction engine 702 can be implemented. In particular, the timestamp correction engine 702 can be implemented by a computing device 704. Timestamp correction engine 702 can operate on images similar to the previously discussed images 210 and 220 of FIGS. 2A and 2B.

In some embodiments, the computing device 704 can be one or more server computing devices. In the instance in which computing device 704 includes a plurality of server computing devices, the server computing devices can operate according to a parallel computing architecture, a sequential computing architecture, or a combination of such architectures. In other embodiments, the computing device 704 can be a tablet, smartphone, or other personal computing device.

The computing device 704 can include random access memory 712 and a processor 714 which executes the software instructions of the timestamp correction engine 702. In some implementations, the processor 714 can be a multi-core processor.

In the embodiment shown in FIG. 7, the timestamp correction engine 702 can include a timekeeping device recognition module 705, a time disambiguation module 706, and a timestamp correction module 708 stored as computer-readable instructions on a storage medium (or "program storage") 710 that can be tangible and non-transitory.

Computing device 704 can implement timekeeping device recognition module 705 to recognize one or more timekeeping devices at least partially displayed within one or more images. Furthermore, timekeeping device recognition module 705 can be implemented to identify a time displayed by a recognized timekeeping device. Thus, for example, timekeeping device recognition module 705 can perform object recognition, object segmentation, optical character recognition, or other computer vision techniques to recognize timekeeping devices and read their displayed times.

Computing device 704 can implement time disambiguation module 706 to disambiguate a 12-hour time value into a 24-hour time value. For example, time disambiguation module 706 can analyze a combination of user location information, landmarks depicted in an image, a sun inclination depicted in an image, expected sun inclinations for various times and locations, or other information to disambiguate a 12-hour value into a 24-hour value. As an example, time disambiguation module 706 can be implemented to perform one or more of methods (400), (500), and (600).

Computing device 704 can implement timestamp correction module 708 to use a camera clock offset to correct timestamps of images. For example, timestamp correction module 708 can update or otherwise adjust the timestamp associated with each image included in one or more sets of images captured by the same image capture device. In some embodiments, timestamp correction module 708 can edit or replace timestamp metadata associated with each image. In other embodiments, timestamp correction module 708 can correlate images having corrected timestamps with other time-specific data.

The timestamp correction engine 702 can receive input from an input sub-system 716a which is communicatively coupled to the computing device 704. The input sub-system 716a generally can include one or more of a pointing device such as a mouse, a keyboard, a touch screen, a trackball device, a digitizing tablet, etc. The timestamp correction engine 702 provides output to a user via the output sub-system 716b. The output 716b can include a video monitor, a liquid crystal display (LCD) screen, etc.

The timestamp correction engine 702 can also be communicatively coupled to a communication interface 717. The communication interface 717 generally can include a wired Ethernet communication link, a wireless Ethernet communication link, etc. The timestamp correction engine 702 can communicate with remote hosts (not shown) disposed on a network 718 via the communication interface 717.

In some implementations, the timekeeping device recognition module 705, the time disambiguation module 706, and/or the timestamp correction module 708 can be disposed on different devices interconnected via the network 718. Referring back to FIG. 1, for example, the timekeeping device recognition module 705, the time disambiguation module 706, and/or the timestamp correction module 708 can be disposed on the application server 122.

Certain embodiments are described in this disclosure as including logic or a number of components, modules, or mechanisms. Modules can constitute either software modules (e.g., code embodied on a machine-readable medium or in a transmission signal) or hardware modules. A hardware module is tangible unit capable of performing certain operations and can be configured or arranged in a certain manner. In example embodiments, one or more computer systems (e.g., a standalone, client or server computer system) or one or more hardware modules of a computer system (e.g., a processor or a group of processors) can be configured by software (e.g., an application or application portion) as a hardware module that operates to perform certain operations as described in this disclosure.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent to one of ordinary skill in the art.

What is claimed is:

1. A computer-implemented method for correcting image timestamps, the method comprising:

obtaining, by one or more computing devices, a first image from among a plurality of images, wherein the first image includes imagery depicting at least in part a timekeeping device, and wherein a first timestamp is associated with the first image, the first timestamp indicating an internal time of an image capture device when the image capture device captured the first image;

analyzing, by the one or more computing devices, the imagery depicting at least in part the timekeeping device to determine a first time displayed by the timekeeping device in the imagery;

determining, by the one or more computing devices, whether the first time comprises a 12-hour value or a 24-hour value;

when it is determined that the first time comprises a 12-hour value, determining, by the one or more computing devices, a corresponding 24-hour value for the 12-hour value based at least in part on information contained within the plurality of images;

determining, by the one or more computing devices, a clock offset between the 24-hour value and the first timestamp; and adjusting, by the one or more computing devices, a plurality of timestamps by the clock offset, wherein the plurality timestamps are respectively associated with the plurality of images captured by the image capture device.

2. The computer-implemented method of claim 1, wherein determining, by the one or more computing devices, the corresponding 24-hour value for the 12-hour value based at least in part on information contained within the plurality of images comprises:

determining, by the one or more computing devices, an inclination of the sun depicted in the first image;

identifying, by the one or more computing devices, one or more landmarks depicted by the first image; and determining an expected AM sun inclination and an expected PM sun inclination for a location associated with the one or more landmarks;

comparing, by the one or more computing devices, the inclination of the sun to the expected AM sun inclination and the expected PM sun inclination; and selecting, by the one or more computing devices, an AM value or a PM value for the 12-hour value based at least in part on the comparison of the inclination of the sun to the expected AM sun inclination and the expected PM sun inclination.

3. The computer-implemented method of claim 1, wherein determining, by the one or more computing devices, a corresponding 24-hour value for the 12-hour value based at least in part on information contained within the first image comprises
 determining, by the one or more computing devices, an inclination of the sun depicted in the first image; and
 determining, by the one or more computing devices, the corresponding 24-hour value for the 12-hour value based at least in part on the inclination of the sun depicted in the first image.

4. The computer-implemented method of claim 3, wherein determining, by the one or more computing devices, the corresponding 24-hour value for the 12-hour value based at least in part on the inclination of the sun depicted in the first image comprises selecting, by the one or more computing devices, an AM value or a PM value for the 12-hour value based at least in part on the inclination of the sun depicted in the first image.

5. The computer-implemented method of claim 3, wherein determining, by the one or more computing devices, the corresponding 24-hour value for the 12-hour value based at least in part on the inclination of the sun depicted in the first image comprises:
 determining, by the one or more computing devices, a location at which the first image was captured;
 comparing, by the one or more computing devices, the inclination of the sun to an expected AM sun inclination and an expected PM sun inclination for the location; and
 selecting, by the one or more computing devices, an AM value or a PM value for the 12-hour value based at least in part on the comparison of the inclination of the sun to the expected AM sun inclination and the expected PM sun inclination.

6. The computer-implemented method of claim 5, wherein determining, by the one or more computing devices, the location at which the first image was captured comprises:
 obtaining, by the one or more computing devices, time-indexed location data associated with a user of the image capture device;
 determining, by the one or more computing devices, one or more locations specified by the time-indexed location data at one or more instances of the 12-hour value; and
 using, by the one or more computing devices, the one or more locations specified by the time-indexed location data as the location at which the first image was captured.

7. The computer-implemented method of claim 6, wherein the time-indexed location data associated with the user of the image capture device comprises GPS data associated with the image capture device.

8. The computer-implemented method of claim 1, wherein adjusting, by the one or more computing devices, the plurality of timestamps by the clock offset comprises:
 obtaining, by the one or more computing devices, the plurality of images captured by the image capture device;
 determining, by the one or more computing devices, a subset of the plurality of images that have timestamps within a threshold time from the first timestamp; and
 adjusting, by the one or more computing devices for only the images included in the subset, the timestamp for each of the subset of images by the clock offset.

9. The computer-implemented method of claim 1, wherein adjusting, by the one or more computing devices, the plurality of timestamps by the clock offset comprises:
 obtaining, by the one or more computing devices, the plurality of images captured by the image capture device;
 clustering, by the one or more computing devices, the plurality of images into one or more clusters based on a frequency of capture exhibited by the plurality of images;
 adjusting, by the one or more computing devices for only the images included in the same cluster as the first image, the timestamp for each image included in the same cluster as the first image by the clock offset.

10. The computer-implemented method of claim 1, further comprising, after adjusting, by the one or more computing devices, the plurality of timestamps by the clock offset:
 determining, by the one or more computing devices, a plurality of locations respectively associated with the plurality of images by respectively comparing the plurality of adjusted timestamps to time-indexed location data associated with a user of the image capture device; and
 generating, by the one or more computing devices, metadata for each of the plurality of images, wherein the metadata for each image indicates the location associated with such image.

11. The computer-implemented method of claim 10, wherein the time-indexed location data associated with a user of the image capture device comprises time-indexed location data associated with a second device associated with the user, the second device being distinct from the image capture device.

12. One or more non-transitory computer-readable media storing instructions that, when executed by one or more processors, cause the one or more processors to perform operations, the operations comprising:
 identifying an image that depicts a clock, wherein the image was captured by an image capture device;
 analyzing the image to determine a time displayed by the clock;
 when the time is a 12-hour value:
  determining an inclination of the sun depicted in the image or depicted in another image captured by the image capture device within a threshold period of time;
  determining a coarse location at which the image was captured; and
  determining a 24-hour value for the 12-hour value based at least in part on the inclination of the sun and the coarse location;
 determining a clock offset between the 24-hour value and a timestamp associated with the image; and
 adjusting a plurality of timestamps by the clock offset, wherein the plurality of timestamps are respectively associated with a plurality of images captured by the image capture device.

13. The one or more non-transitory computer-readable media of claim 12, wherein determining the coarse location at which the image was captured comprises identifying one or more locations specified by time-indexed location data associated with a user of the image capture device.

14. The one or more non-transitory computer-readable media of claim 13, wherein the time-indexed location data comprises GPS data associated with a second device associated with the user, wherein the second device is distinct from the image capture device.

15. The one or more non-transitory computer-readable media of claim 12, wherein determining the 24-hour value for the 12-hour value based at least in part on the inclination of the sun and the coarse location comprises:

obtaining an expected AM sun inclination associated with the coarse location and an AM version of the 12-hour value;

obtaining an expected PM sun inclination associated with the coarse location and a PM version of the 12-hour value; and selecting either the AM version of the 12-hour value or the PM version of the 12-hour value as the 24-hour value based at least in part on a comparison of the inclination of the sun to the expected AM sun inclination and the expected PM sun inclination.

16. A computing system for correcting image timestamps, the system comprising:
    one or more computing devices; and
    one or more non-transitory computer-readable media storing instructions that, when executed by the one or more computing devices, cause the one or more computing devices to perform operations, the operations comprising:
        obtaining a plurality of images captured by an image capture device, wherein a plurality of timestamps are respectively associated with the plurality of images;
        identifying a first image of the plurality of images that includes imagery depicting at least in part a timekeeping device;
        determining a first time displayed by the timekeeping device in the first image;
        disambiguating between an AM version of the first time and a PM version of the first time based at least in part on location information associated with the first image;
        determining an offset between the first time and the timestamp of the first image; and
        adjusting the plurality of timestamps by the offset.

17. The computing system of claim 16, wherein disambiguating between the AM version of the first time and the PM version of the first time based at least in part on location information associated with the first image comprises:
    determining a location at which the first image was captured;
    matching the location against time-indexed location data associated with a user associated with the first image; and
    selecting the AM version or the PM version of the first time based at least in part on the matching.

18. The computing system of claim 17, wherein
    matching the location against time-indexed location data associated with the user associated with the first image comprises determining, based at least in part on the time-indexed location data, whether the user was located at the location at only the AM version of the first time or at only the PM version of the first time; and
    selecting the AM version or the PM version of the first time based at least in part on the matching comprises:
        selecting the AM version when it is determined, based at least in part on the time-indexed location data, that the user was located at the location at only the AM version of the first time; and
        selecting the PM version when it is determined, based at least in part on the time-indexed location data, that the user was located at the location at only the PM version of the first time.

19. The computing system of claim 16, wherein adjusting the plurality of timestamps by the offset comprises:
    clustering the plurality of images based at least in part on the plurality of timestamps; and
    adjusting the timestamps by the offset for only a first subset of the plurality of images that are included in a first cluster of which the first image is a member.

20. The computing system of claim 16, wherein adjusting the plurality of timestamps by the offset comprises:
    clustering the plurality of images based at least in part on one or more trends exhibited by a device photo capture history associated with the image capture device; and
    adjusting the timestamps by the offset for only a first subset of the plurality of images that are included in a first cluster of which the first image is a member.

* * * * *